United States Patent [19]

Neumann

[11] 4,434,192

[45] Feb. 28, 1984

[54] PROCESS FOR MAKING WATER ACTIVATABLE TILES

[75] Inventor: Solomon Neumann, London, England

[73] Assignee: Easy-Do Products Limited, London, England

[21] Appl. No.: 128,182

[22] Filed: Mar. 7, 1980

Related U.S. Application Data

[63] Continuation of Ser. No. 939,694, Sep. 5, 1978, abandoned.

[30] Foreign Application Priority Data

Sep. 13, 1977 [GB] United Kingdom ............... 38195/77

[51] Int. Cl.$^3$ ............................................... B05D 1/32
[52] U.S. Cl. .................................... 427/282; 427/286; 427/372.2; 428/198; 428/215; 428/241; 428/331; 428/343; 428/350; 428/355; 428/356; 428/456; 428/913
[58] Field of Search .................. 52/390; 428/215, 241, 428/331, 343, 350, 355, 356, 456, 913, 198; 427/256, 282-286, 372.2

[56] References Cited

U.S. PATENT DOCUMENTS

| | | | |
|---|---|---|---|
| 2,108,226 | 2/1938 | Johnston | 52/390 |
| 2,168,949 | 8/1939 | Bentz | 52/390 |
| 2,746,881 | 5/1956 | Wegener | 428/356 |
| 2,934,932 | 5/1960 | Wagner | 52/390 |
| 2,970,124 | 1/1961 | Drummond | 52/390 |
| 3,200,094 | 8/1965 | Sederlund | 428/355 |
| 4,061,825 | 12/1977 | Counsell | 428/355 |

*Primary Examiner*—Marion McCamish
*Attorney, Agent, or Firm*—Watson, Cole, Grindle & Watson

[57] ABSTRACT

A self-adhesive ceramic or other rigid tile having on a face thereof which is to be adhered to a surface a whole or partial, dry coating of a hydraulically active tile composition comprising a hydraulic material and a water-soluble adhesive. A method for the preparation of these tiles comprises applying to a face of a tile a paste comprising a dispersion in a liquid medium of a hydraulic material, a water-soluble adhesive, and/or if necessary, a solvent-soluble adhesive, and drying the tile face to remove the liquid medium.

On immersion or dipping of the tiles in water the tile composition absorbs enough water to be converted into a paste having adequate adhesive properties for the tiles to be fixed to a surface to be tiled.

6 Claims, No Drawings

PROCESS FOR MAKING WATER ACTIVATABLE TILES

This application is a continuation of application Ser. No. 939,694 filed Sept. 5, 1978, now abandoned.

BACKGROUND OF THE INVENTION

The present invention relates to self-adhesive tiles and to a process for the manufacture thereof.

There are various known methods of fixing ceramic tiles to walls and other surfaces. The oldest method is to set the tiles in a bed of wet sand and cement mix, and today this method is widely practised using so-called "thin bed cements". These beds usually have a thickness of between 2 and 5 mm and can be prepared using a water-based adhesive containing cement mix, a water-based thick, filled rubber adhesive or an adhesive based on a filled polyvinyl acetate or other polymer emulsion.

Alternatively, the tiles are "buttered" on the back with a layer of wet adhesive of the above type to the required thickness or thick lines or spots of adhesive are applied to the back of the tiles (termed "spot fixing"). When using this alternative method, it is essential that the wet adhesive should be applied as a whole or partial coating having a thickness of at least 1 mm, usually 1 to 5 mm, in order that protrusions and indentations in the surface to be tiled and/or any slight distortions in the tiles themselves can be accommodated.

It is also of importance for good tiling that the adhesive should remain in an unset condition for a reasonable period of time, for example, five to ten minutes or even longer, so that after a number of tiles have been positioned on the surface, it remains possible to move the tiles at least fractionally to correct discrepancies resulting from the unevenness of the surface, distortions in the surface of the tiles, and size differences in the tiles, thereby to avoid staggered grout lines.

It is also known to make self-adhesive ceramic tiles where the tiles are provided on the back surface with a whole or partial coating of a pressure-sensitive adhesive. When a pressure-sensitive adhesive is used alone in this manner the coating usually has a thickness of 0.2 mm or more, and when thinner coatings are used a compressible underlay, e.g. expanded polystyrene or netting, is put on the back of the tiles to take up unevenness in the surface to be tiled. The disadvantage of using this kind of tile (dry tiling) is that the tiles, once positioned on a surface, are fixed immediately and cannot easily be moved to correct discrepancies as mentioned above.

Flexible tiles provided with a solvent-activatable adhesive coating are described in U.S. Pat. No. 3,442,730. The solvent-activatable coating is based on a polymeric material which is applied as a very thin layer of from 0.004 to 0.006 inches to a surface of a flexible tile. A very thin coating of this type would be of no use for application to rigid tiles, since it would not accommodate any unevenness or irregularity in the surface to be tiled.

The adhesive coating is activatable by a suitable solvent such as an alcohol admixed with a small amount of water. The coating is not, however, activatable by means of water alone as the solvent.

Tiles provided with their own coating of a water-soluble re-moistenable adhesive have not, up to now, been used or made for the purpose of tiling because the usual tile adhesive or tile cements when applied to tiles in wet paste form in a suitable thickness, and then dried, cannot be easily re-activated to their original paste form. On drying a skin forms on a coating of adhesive of suitable thickness which prevents water from penetrating the coating so that it is difficult to re-activate the adhesive within a reasonable period of time to provide a suitably soft adhesive paste which will spread easily when the tile is applied to a surface. In any case an adhesive of this type would remain water sensitive and therefore unsuited to service in bathrooms and showers. Hydraulic materials when applied in water cannot be re-activated at all after setting and drying.

I have now developed a process for the manufacture of self-adhesive ceramic or other rigid tiles having a dry hydraulically active tile composition adhered to a face thereof, whereby on immersion or dipping of the tiles in water the dry hydraulically active tile composition absorbs enough water to be converted into a paste having adequate adhesive and hydraulic properties for the tiles to be fixed to the surface to be tiled.

SUMMARY OF THE INVENTION

Accordingly, the present invention provides a process for the manufacture of self-adhesive ceramic or other rigid tiles which comprises applying to a face of a tile a paste comprising a dispersion in a liquid medium (as hereinafter defined) of a hydraulic material, a water-soluble adhesive, and/or if necessary, a solvent-soluble adhesive, and drying the tile face to remove the liquid medium.

The present invention also provides a self-adhesive ceramic or other rigid tile having on a face thereof which is to be adhered to a surface a whole or partial, dry coating of a hydraulically active tile composition comprising a hydraulic material and a water-soluble adhesive.

DETAILED DESCRIPTION OF THE INVENTION

By the term "liquid medium" as used herein is meant a medium having no affect, or only a very limited affect, on the hydraulic properties of the hydraulic material.

In carrying out the process of the present invention a suitable liquid medium has to be chosen. Suitable liquid mediums are water-miscible organic solvents, such as alcohol or acetone, or water-immiscible organic solvents, such as hydrocarbons or mixtures thereof, which have no or a limited detrimental affect on the hydraulic properties of the hydraulic material or the water-soluble adhesive. It has also been found that considerable amounts of water may be included in the liquid medium without any substantial detrimental affect on the hydraulic properties of the hydraulic material, providing that the organic solvent inhibits or retards the hydration of the hydraulic material for a period of time such that the water can be removed during the drying of the paste.

When an organic solvent, or mixture of organic solvents, is used alone as the liquid medium-it is necessary to include a small quantity of a solvent-soluble adhesive (0.1 to 1.0% by weight) as a binder in the paste so that the hydraulically active tile composition adheres to the tile face and becomes cohesive after it is dried. Suitable solvent-soluble adhesives are those which can readily develop tack when contacted with the organic solvent or organic solvent mixture. Examples of solvent-soluble adhesives are polyvinyl acetate, which is soluble in ethanol or isopropanol, and other synthetic resins, e.g., rubbers, shellac, high molecular weight polyethylene glycols, alkyd resins and drying oils, which are soluble in a variety of organic solvents.

When water is included in the liquid medium it is not generally necessary to include a solvent-soluble adhesive in the paste, since the water-soluble adhesive contained in the paste will be partly activated and serves to bond and adhere the hydraulically active tile composition to the tile face. Examples of water-soluble adhesives are polyvinyl alcohol, water-soluble celluloses, e.g. methyl cellulose and carboxymethyl cellulose, gum arabic, animal glue and other natural gums. In addition, adhesives which are only water soluble in the presence of alkali, such as casein, may also be used.

The hydraulic material used in the present invention is preferably cement, i.e. Portland cement, high alumina cement or rapid-hardening cement, or mixtures thereof, or plaster of Paris.

The hydraulically active tile composition may also contain a filler and when cement is used as the hydraulic material the use of a filler is preferred. Examples of suitable fillers are those which have a good bonding affinity to cement or plaster, such as silica powder, china clay, carbonates such as limestone and whiting, and fibrous materials such as asbestos, cellulose fibres, nylon fibres, glass fibres, and fine sand, the most preferred filler being silica powder.

In preparing the tiles according to the present invention, the paste is applied to the whole or part of the face of the tile which is to be adhered to a surface. When the coating is a partial coating it may be applied as stripes, strips, spots or grids, or in any other suitable pattern.

The coating weight of the hydraulically active tile composition on the tile face should generally be such that the activated composition has a thickness which provides for the requisite manoeuverability of the tile and which can accommodate distortions, etc., in the tile face and in the surface to be tiled. In general, the activated coating should have a thickness of 1 mm or more, typically 1 to 5 mm.

In practice, the dried coatings can readily be activated in a reasonable period of time of the order of from 0.5 to 60 seconds, typically from 1 to 20 seconds. For example, the coatings may be activated by immersion in water, brushing, sponging, or spraying with water, and after suitable activation the tiles may be applied to a surface immediately, or left for up to 30 minutes or more before application. Accordingly, a number of tiles with activated coatings can be left for a reasonable period of time before tiling is commenced, which may be of advantage in certain circumstances.

Since the coatings contain a hydraulically active material, the fixed tiles, after setting and drying, will have a good water resistance. This is of great importance in showers, bathrooms, kitchens, etc., where the tiles come into contact with condensation and running water. Also, advantageously such tiles are useful where permanent damp conditions exist in the surface to be tiled.

In carrying out the process of the present invention, it is generally preferred to employ one or more of the following additional features:

(a) The inclusion in the hydraulically active tile composition of a material having a high water absorption capacity, such as asbestos, cellulose or other fibres, wood flour, ultra-fine silica gel powders, for example, those sold under the trade name Aerosil, Gasil and Cabosil and diatomaceous earths such as kieselguhr. By this means the water absorption of the composition can be increased.

(b) The inclusion in the hydraulically active tile composition of a wetting aid which may be any of the well-known surface active agents available in the trade. By this means the rate of water absorption of the composition can be accelerated and its redevelopment into a paste can be improved.

(c) Where necessary, wholly or partly sealing the face of the tile to prevent water penetrating into the tile itself instead of activating the composition. By this means again the water absorption of the composition is increased.

(d) Rubbing down, perforating or otherwise removing part of any skin formed at the surface of the coating after drying to provide better access for water to the centre of the coating. This again accelerates the rate of water absorption.

The hydraulically active tile composition used in the present invention is preferably also suitable for grouting. Thus, by depositing an excess of a suitable hydraulic composition onto a face of the tile, and preferably up to the edges of the tile, when the tile is activated and applied to a surface to be tiled, a surplus of the composition is squeezed out around the tile. This surplus fills the spaces between the tiles, thereby fixing and grouting the tiles in one operation. This is clearly advantageous, since normally the grouting material has to be pushed into the grout lines after fixing, thus giving rise to incomplete filling especially for narrow grout lines, and often leaving voids which can then be the cause of grout shrinkage and cracking. When the grouting material is deposited on the back face and preferably also to the edges of the tile, the pressure for filling the grout lines comes from the back of the tile, thereby greatly reducing the chance of failure.

The present invention will be further described with reference to the following Examples.

EXAMPLE 1

|  | Parts by weight |
| --- | --- |
| White cement | 50 |
| Fine silica powder | 50 |
| Gasil (Registered Trade Mark) | 1 |
| Polyvinyl alcohol powder | 3 |
| Non-ionic surfactant | 0.1 |
| Polyvinyl acetate powder | 0.5 |
| Xylene | 80 |

The powder ingredients were well mixed and dispersed in the xylene which contained the non-ionic surfactant. Thorough mixing was given to ensure solution of the polyvinyl acetate and to provide a smooth paste. The paste was applied to the backs of tiles, the tiles having been sealed with a polyvinyl acetate emulsion diluted with water to 10% solids, using combs or other devices to provide ribs or lines approximately 2.5 mm in height. The tiles were freed of solvent by oven drying at 140° C.

EXAMPLE 2

|  | Parts by weight |
| --- | --- |
| White cement | 40 |
| Fine silica powder | 60 |
| Kieselguhr | 5 |
| Powdered glue | 0.5 |

-continued

| | Parts by weight |
|---|---|
| Polyvinyl alcohol powder | 3.5 |
| Cationic surfactant | 0.1 |
| 78% Isopropyl alcohol | |
| | 70 |
| 22% Water | |

The powdered materials were mixed together and thoroughly mixed into the alcohol/water mixture which contained the cationic surfactant.

The resulting smooth paste was applied to the backs of tiles as ribs or about 2.5 mm in height. The tiles were then dried at 130° C. to remove the solvent.

EXAMPLE 3

| | Parts by weight |
|---|---|
| White Portland Cement | 40 |
| Fine silica powder or sand | 60 |
| Polyvinyl alcohol powder | 3 |
| 81% Isopropyl alcohol | |
| | 65 |
| 19% Water | |

The powder ingredients were mixed together and introduced into the alcohol/water mixture and the whole agitated for 10 minutes before the just fluid dispersion was combed in the form of ribs onto the backs of 10% polyvinyl alcohol solution primed tiles. The tiles were subsequently dried at 120° C.

EXAMPLE 4

| | Parts by weight |
|---|---|
| Cement 20% by weight high alumina | |
| | 40 |
| 80% by weight Portland | |
| Silica Powder | 60 |
| Polyvinyl alcohol powder | 3 |
| Polyox WSRN 10 (high molecular weight polyglycol powder - sold by Union Carbide Corporation) | 0.6 |
| 100% Isopropyl alcohol | 63 |

The powder ingredients were dispersed in the alcohol and the resulting dispersion formed as ribs onto the primed backs of tiles. The tiles were subsequently dried at 100° C.

EXAMPLE 5

| | Parts by weight |
|---|---|
| Portland cement | 40 |

-continued

| | Parts by weight |
|---|---|
| Silica Powder | 60 |
| Casein Powder | 3 |
| Polyvinyl acetate powder | 0.4 |
| 100% Isopropyl alcohol | 65 |

The polyvinyl acetate powder was first dissolved by dispersing and dissolving it by heating in about ⅔ of the alcohol, the remainder of the alcohol being added, followed by the powdered ingredients premixed together.

The resulting paste was formed as ribs on the backs of primed tiles. The tiles were then dried at 120° C.

EXAMPLE 6

| | parts by weight |
|---|---|
| Plaster of Paris powder | 100 |
| Casein Powder | 3 |
| Lime (fresh calcium hydroxide) powder | 6 |
| WSRN 10 powder | 0.75 |
| 100% Isopropyl alcohol | 80 |

All the powdered ingredients as a premix were introduced into the alcohol with stirring and the subsequent paste was screened in a pattern of spots onto the backs of primed tiles. The tiles were dried at 120° C.

I claim:

1. A process for the manufacture of a water-activatable self-adhering rigid tile product which consists of
   dispersing in a liquid medium which includes an organic solvent and water a mixture consisting of a hydraulic material, a filler and a water-soluble adhesive to form a dispersion,
   applying said dispersion to at least a portion of the face of a rigid tile intended to be adhered to a supporting surface, and
   drying said dispersion on said tile face to evaporate said liquid medium, thereby leaving a water-activatable self-adhering paste which is activatable by immersion in water for less than about 60 seconds.

2. A process according to claim 1 wherein the organic solvent is selected from the group consisting of an alcohol, acetone and a hydrocarbon.

3. A process according to claim 2 wherein the liquid medium includes up to 22% by weight of water.

4. A process according to claim 1 wherein the water-soluble adhesive is selected from the group consisting of a polyvinyl alcohol, a water-soluble cellulose, gum arabic, an animal glue, a natural gum and casein.

5. A process according to claim 1 wherein said dispersion is applied to said rigid tile using a comb so as to form a spaced apart rib pattern thereon.

6. A process according to claim 1 wherein said dispersion is applied to said rigid tile through a screen so as to form a pattern of spaced apart spots thereon.

* * * * *